(12) United States Patent
Jeon et al.

(10) Patent No.: US 10,721,737 B2
(45) Date of Patent: Jul. 21, 2020

(54) METHOD AND APPARATUS FOR COMMUNICATION USING A PLURALITY OF CELLS IN A WIRELESS COMMUNICATION SYSTEM

(71) Applicants: Samsung Electronics Co., Ltd., Suwon-si, Gyeonggi-do (KR); DEUTSCHE TELEKOM AG, Bonn (DE)

(72) Inventors: Joseph Jeon, Seongnam-si (KR); Jaroslav Holis, Kozlovice (CZ); Seungjoo Maeng, Seongnam-si (KR); Chanho An, Seoul (KR); Seunghee Han, Suwon-si (KR)

(73) Assignees: Samsung Electronics Co., Ltd., Suwon-si (KR); DEUTSCHE TELEKOM AG, Bonn (DE)

(*) Notice: Subject to any disclaimer, the term of this patent is extended or adjusted under 35 U.S.C. 154(b) by 0 days.

(21) Appl. No.: 16/545,793

(22) Filed: Aug. 20, 2019

(65) Prior Publication Data
US 2020/0008199 A1 Jan. 2, 2020

Related U.S. Application Data

(62) Division of application No. 15/547,982, filed as application No. PCT/KR2016/001501 on Feb. 15, 2016, now Pat. No. 10,542,542.

(30) Foreign Application Priority Data

Feb. 17, 2015 (EP) .................................. 15155478

(51) Int. Cl.
*H04W 36/30* (2009.01)
*H04W 72/04* (2009.01)
(Continued)

(52) U.S. Cl.
CPC ...... *H04W 72/0453* (2013.01); *H04B 7/0413* (2013.01); *H04L 5/001* (2013.01);
(Continued)

(58) Field of Classification Search
CPC .......... H04W 36/30; H04W 36/00835; H04W 36/04; H04W 72/042
(Continued)

(56) References Cited

U.S. PATENT DOCUMENTS 9,191,098 B2 11/2015 Kazmi et al.
9,362,998 B2 * 6/2016 He .......................... H04B 7/046
(Continued)

FOREIGN PATENT DOCUMENTS

EP 2775758 A1 9/2014
EP 3059891 A1 8/2016
(Continued)

*Primary Examiner* — William D Cumming
(74) *Attorney, Agent, or Firm* — Jefferson IP Law, LLP

(57) ABSTRACT

A cell configuration method of a base station in a mobile communication system supporting Carrier Aggregation (CA) which includes configuring a first cell consisting of at least two sectors formed with different antennas to a terminal, configuring a second cell consisting of at least two sectors formed with different antennas to the terminal, and communicating with the terminal through the first and second cells, wherein one of the first and second cells consists of sectors using same Physical Cell Identifier (PCID) and the other consists of sectors using different PCIDs.

12 Claims, 12 Drawing Sheets

(51) Int. Cl.
    *H04L 5/00*                (2006.01)
    *H04B 7/0413*         (2017.01)
    *H04L 12/24*          (2006.01)
    *H04W 16/32*         (2009.01)
    *H04W 88/08*         (2009.01)
    *H04W 48/16*         (2009.01)
    *H04W 88/02*         (2009.01)

(52) U.S. Cl.
    CPC ......... *H04L 41/0803* (2013.01); *H04W 16/32* (2013.01); *H04W 48/16* (2013.01); *H04W 72/04* (2013.01); *H04W 88/02* (2013.01); *H04W 88/08* (2013.01)

(58) Field of Classification Search
    USPC ...... 455/422.1, 450; 370/252, 328, 329, 280
    See application file for complete search history.

(56) References Cited

U.S. PATENT DOCUMENTS

| | | | |
|---|---|---|---|
| 9,374,203 B2 * | 6/2016 | Kim .................. | H04L 5/001 |
| 9,374,757 B2 * | 6/2016 | Lee .................. | H04W 36/30 |
| 9,686,729 B2 | 6/2017 | Zingler | |
| 9,893,792 B2 * | 2/2018 | Han .................. | H04L 1/0031 |
| 9,906,286 B2 * | 2/2018 | Choi .................. | H04L 1/0026 |
| 9,998,936 B2 | 6/2018 | Narasimha et al. | |
| 10,194,439 B2 | 1/2019 | Dinan | |
| 10,542,542 B2 * | 1/2020 | Jeon .................. | H04L 5/001 |
| 2010/0291934 A1 | 11/2010 | Lopes | |
| 2010/0311407 A1 * | 12/2010 | Yao .................. | H04W 36/00835 455/422.1 |
| 2011/0038326 A1 | 2/2011 | Davies et al. | |
| 2011/0110347 A1 | 5/2011 | Mun | |
| 2011/0111745 A1 | 5/2011 | Li et al. | |
| 2011/0194407 A1 | 8/2011 | Ji et al. | |
| 2012/0208556 A1 | 8/2012 | Jung et al. | |
| 2012/0213109 A1 | 8/2012 | Xu et al. | |
| 2012/0281573 A1 | 11/2012 | Kazmi et al. | |
| 2012/0315908 A1 | 12/2012 | Li | |
| 2013/0064226 A1 | 3/2013 | Dinan | |
| 2013/0079007 A1 | 3/2013 | Nagaraja et al. | |
| 2013/0094384 A1 | 4/2013 | Park et al. | |
| 2013/0258973 A1 | 10/2013 | Khoshnevis et al. | |
| 2013/0310019 A1 | 11/2013 | Visotsky et al. | |
| 2013/0344816 A1 | 12/2013 | Niu et al. | |
| 2014/0071891 A1 | 3/2014 | Zhou et al. | |
| 2014/0185480 A1 * | 7/2014 | Lee .................. | H04W 36/30 370/252 |
| 2015/0043367 A1 * | 2/2015 | Kim .................. | H04W 36/04 370/252 |
| 2015/0049695 A1 | 2/2015 | Aiba et al. | |
| 2015/0092768 A1 | 4/2015 | Ng et al. | |
| 2015/0131494 A1 * | 5/2015 | He .................. | H04W 72/042 370/280 |
| 2015/0189574 A1 | 7/2015 | Ng et al. | |
| 2015/0208361 A1 | 7/2015 | Kim et al. | |
| 2015/0223149 A1 | 8/2015 | Liu et al. | |
| 2015/0223245 A1 | 8/2015 | Cheng et al. | |
| 2015/0304092 A1 | 10/2015 | Hwang et al. | |
| 2015/0312789 A1 | 10/2015 | You et al. | |
| 2015/0312851 A1 | 10/2015 | Ode | |
| 2015/0326295 A1 | 11/2015 | Kwon et al. | |
| 2015/0350941 A1 | 12/2015 | You et al. | |
| 2016/0100447 A1 | 4/2016 | Chen et al. | |
| 2016/0134351 A1 * | 5/2016 | Choi .................. | H04L 1/0026 370/328 |
| 2016/0164589 A1 * | 6/2016 | Han .................. | H04L 5/0041 370/329 |
| 2016/0286456 A1 | 9/2016 | Zingler | |
| 2017/0078953 A1 | 3/2017 | You et al. | |
| 2017/0094539 A1 | 3/2017 | Narasimha et al. | |
| 2017/0094658 A1 * | 3/2017 | He .................. | H04L 1/1854 |
| 2017/0099667 A1 | 4/2017 | Dinan | |
| 2017/0105112 A1 | 4/2017 | Park et al. | |
| 2017/0150407 A1 | 5/2017 | Mariasoosei et al. | |
| 2017/0201308 A1 | 7/2017 | Park et al. | |
| 2017/0215097 A1 | 7/2017 | Park et al. | |
| 2017/0223686 A1 | 8/2017 | You et al. | |
| 2018/0027562 A1 * | 1/2018 | Jeon .................. | H04L 41/0803 455/450 |
| 2019/0141777 A1 * | 5/2019 | Kim .................. | H04L 1/18 |
| 2020/0008199 A1 * | 1/2020 | Jeon .................. | H04L 5/001 |

FOREIGN PATENT DOCUMENTS

KR      10-2014-0079222 A      6/2014
WO          2014-189285 A1     11/2014

\* cited by examiner

METHOD AND APPARATUS FOR COMMUNICATION USING A PLURALITY OF CELLS IN A WIRELESS COMMUNICATION SYSTEM

CROSS-REFERENCE TO RELATED APPLICATION(S)

This application is a divisional application of prior application Ser. No. 15/547,982, filed on Aug. 1, 2017, which is a U.S. National Stage application under 35 U.S.C. § 371 of an International application number PCT/KR2016/001501, filed on Feb. 15, 2016, which is based on and claimed priority of a European patent application number 15155478.9, filed on Feb. 17, 2015, in the European Patent Office, the disclosure of which is incorporated by reference herein in its entirety.

TECHNICAL FIELD

The present invention relates to method and apparatus for communication using a plurality of cells in a wireless communication network. Also, the present invention relates to method and apparatus for communication using multi input and multi output (MIMO) in a wireless communication network.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution Advanced (LTE-A) evolved from LTE, as one of the next-generation mobile communication systems, is underway in the 3rd Generation Partnership Project (3GPP). The term 'LTE system' as used herein may be construed to include the legacy LTE system and the LTE-A system. In order to improve the performance of such systems, discussions are being held on a variety of schemes. The discussion on the Multiple-Input Multiple-Output (MIMO) is also continued. MIMO is a technology to improve transmission efficiency by transmitting data using a plurality of antennas.

DISCLOSURE OF INVENTION

Technical Problem

The present invention aims to provide an improved communication method and apparatus using a plurality of cells in a wireless communication system. Also, the present invention aims to provide a MIMO communication method and apparatus using a plurality of cells in a wireless communication system.

Solution to Problem

In accordance with an aspect of the present invention, a cell configuration method of a base station in a mobile communication system supporting Carrier Aggregation (CA) is provided. The base station includes a communication unit configured to transmit and receive signals and a control unit configured to control transmitting configuration information for a first cell to a terminal, transmitting configuration information for a second cell to the terminal and communicating with the terminal via the first cell and the second cell, wherein at least one of the first and second cells is set same Physical Cell Identifier "PCID".

In accordance with another aspect of the present invention, a base station for cell configuration in a mobile communication system supporting Carrier Aggregation (CA) is provided. The base station includes a communication unit configured to transmit and receive signals and a control unit configured to control transmitting configuration information for a first cell to a terminal, transmitting configuration information for a second cell to the terminal and communicating with the terminal via the first cell and the second cell, wherein at least one of the first and second cells is set same Physical Cell Identifier "PCID"

In accordance with another aspect of the present invention, a cell configuration method of a terminal in a mobile communication system supporting carrier aggregation (CA) is provided. The cell configuration method includes receiving configuration information for a first cell, receiving configuration information for a second cell and communicating via the first and second cells, wherein at least one of the first and second cells is set same Physical Cell Identifier "PCID".

In accordance with still another aspect of the present invention, a terminal for cell configuration in the mobile communication supporting carrier aggregation (CA) is provided. The terminal includes a communication unit configured to transmit and receive signals and a control unit configured to control receiving configuration information for a first cell, receiving configuration information for a second cell and communicating via the first and second cells, wherein at least one of the first and second cells is set same Physical Cell Identifier "PCID".

Other aspects, advantages, and salient features of the invention will become apparent to those skilled in the art from the following detailed description, which, taken in conjunction with the annexed drawings, discloses exemplary embodiments of the invention.

ADVANTAGEOUS EFFECTS OF INVENTION

In accordance with a present invention, it is possible to select a combination of the primary cell (PCell) and secondary cell (SCell) that is capable of providing the UE with the data service optimally depending on at least one of the UE mobility and location and load conditions of the respective cells. Even when the UE is located at a cell edge, it is possible achieve high modulation order and evenly high data rate through MIMO transmission on the component carrier (CC) composed of the cells allocated the same PCID.

BRIEF DESCRIPTION OF DRAWINGS

The above and other aspects, features, and advantages of certain exemplary embodiments of the present invention will be more apparent from the following description taken in conjunction with the accompanying drawings, in which.

MODE FOR THE INVENTION

Figure 1:
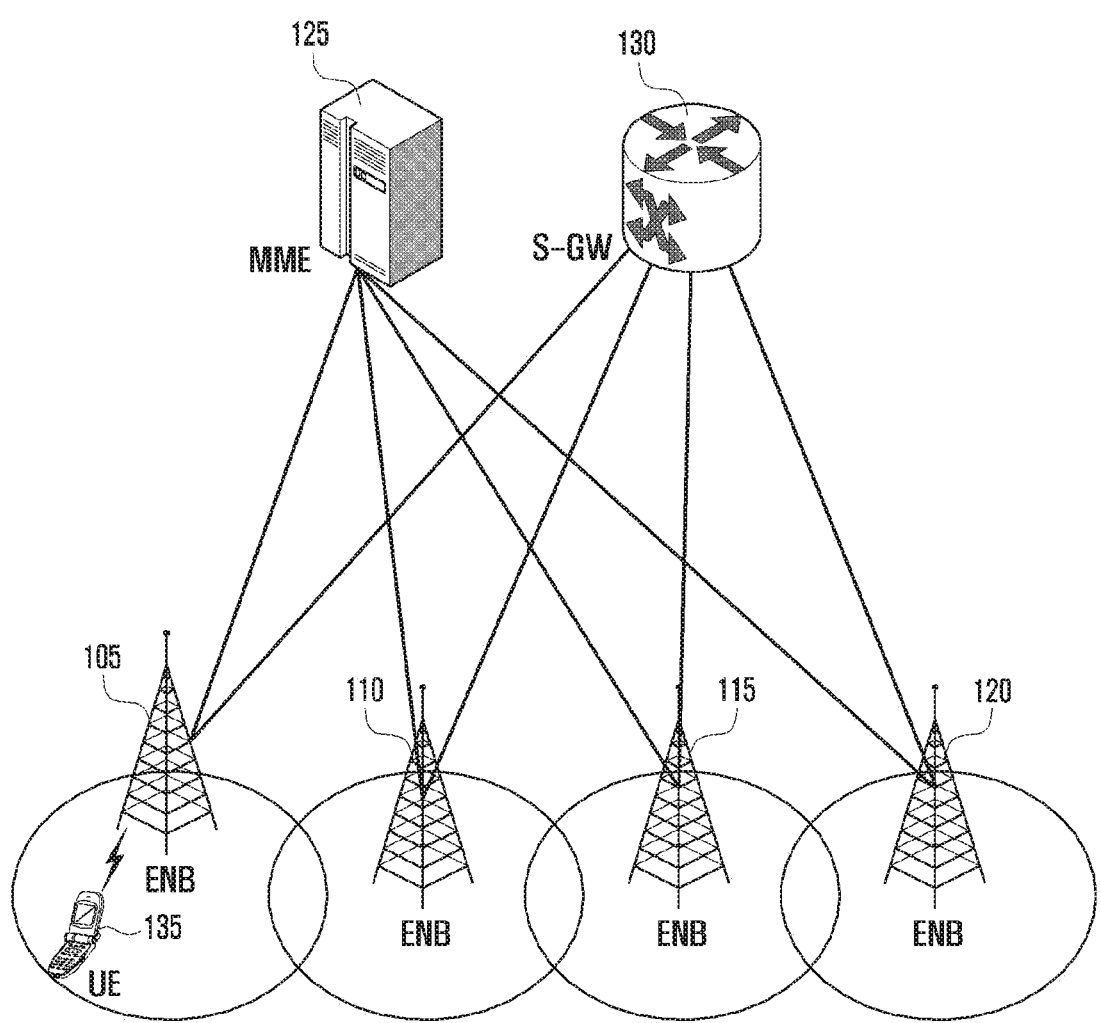
FIG. 1 is a diagram illustrating an architecture of a Long Term Evolution (LTE) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention.

It is to be understood that the singular forms "a," "an," and "the" include plural referents unless the context clearly dictates otherwise. Thus, for example, reference to "a component surface" includes reference to one or more of such surfaces.

The present invention relates to method and apparatus for communication using a plurality of cells in a wireless communication network. Also, the present invention relates to method and apparatus for communication using multi input and multi output (MIMO) in a wireless communication network.

The present invention relates to a method and an apparatus for a carrier aggregation-based MIMO transmission in a multi-cell aggregation-enabled radio communication system. Also, the present invention relates to a method and an apparatus of a radio reception device for a carrier aggregation-based MIMO reception in a multi-cell carrier aggregation-enabled radio communication system.

The MIMO transmission is implemented with MIMO transmission/reception configuration between multiple cells and UEs and, in the case, the multiple cells may be the transmission devices using the same physical cell identification (PCID). The transmission devices may be a base station or an eNB (evolved node B).

Embodiment of the present invention relates to configuring a system supporting carrier aggregation technology, utilizing feedback information from the UE, configuring PCell and SCell of the UE to achieve the desired target throughput, and scheduling UEs for data service.

In an embodiment of the present invention, the service coverage of a base station is split into three sectors, each operating as a cell. That is, one sector can be assumed as one cell, and one Component Carrier (CC) can be split for three sectors, i.e. three cells. The base station performs MIMO transmission in downlink to the terminal using sector-specific antennas. At this time, each sector is assigned at least one antenna, and the sectors may have the same or different numbers of antennas. In the following description, the sectors operating on the CC are referred to as cells. Also, the term 'cell' and 'CC' may be used interchangeably in the same meaning.

Although the embodiments of the present invention are directed to the case where one CC consists of three sectors, the number of sectors per CC is not limited thereto. The sector may be selected based on the directivity of propagation or beamforming. Also, the sector-specific antennas are capable of performing MIMO transmission.

In an embodiment of the present invention, when the base station supports Carrier Aggregation (CA) for use of multiple CCs, the same PCID may be allocated to at least one CC. Even in the case of using the inter-base station CA, the same PCID may be allocated to at least one CC.

FIG. 1 is a diagram illustrating an architecture of a Long Term Evolution (LTE) system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

In FIG. 1, the eNBs 105, 110, 115, and 120 correspond to legacy node Bs of a Universal Mobile Communications System (UMTS). The eNBs 105, 110, 115, and 120 allow the UE to establish a radio link and are responsible for complicated functions as compared to a legacy node B. In an LTE system, all the user traffic including real time services such as Voice over Internet Protocol (VoIP) are provided through a shared channel. Thus, there is a need for an eNB which includes a unit for scheduling data based on state information such as UE buffer conditions, power headroom state, and channel state. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and is connected to a plurality of eNBs 105, 110, 115, and 120.

Figure 2:
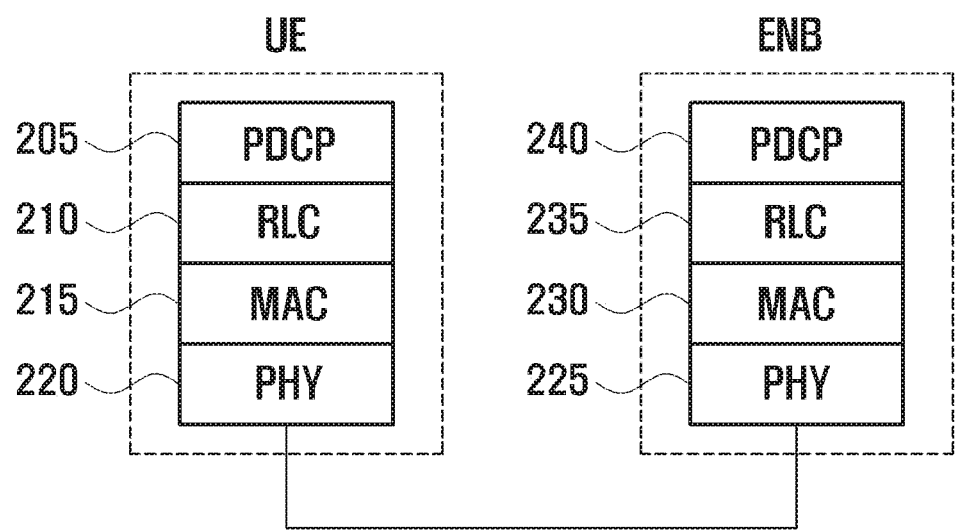
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments of appropriate size for Automatic Repeat Request (ARQ) operation. ARQ is a technique for determining whether the packet transmitted by the transmitter is received by the receiver successfully and for retransmitting the packets which were received erroneously. The MAC 215 and 230 is responsible for establishing connection to a plurality of RLC entities so as to multiplex RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. The 1 bit corresponding to a positive acknowledgement a negative acknowledgement indicator is referred to as HARQ ACK/NACK information. The downlink HARQ ACK/NACK corresponding to uplink transmission is transmitted through a Physical Hybrid-ARQ Indicator Channel (PHICH), and the uplink HARQ ACK/NACK is transmitted through a Physical Uplink Control Channel (PUCCH) or Physical Uplink Shared Channel (PUSCH).

Figure 3:
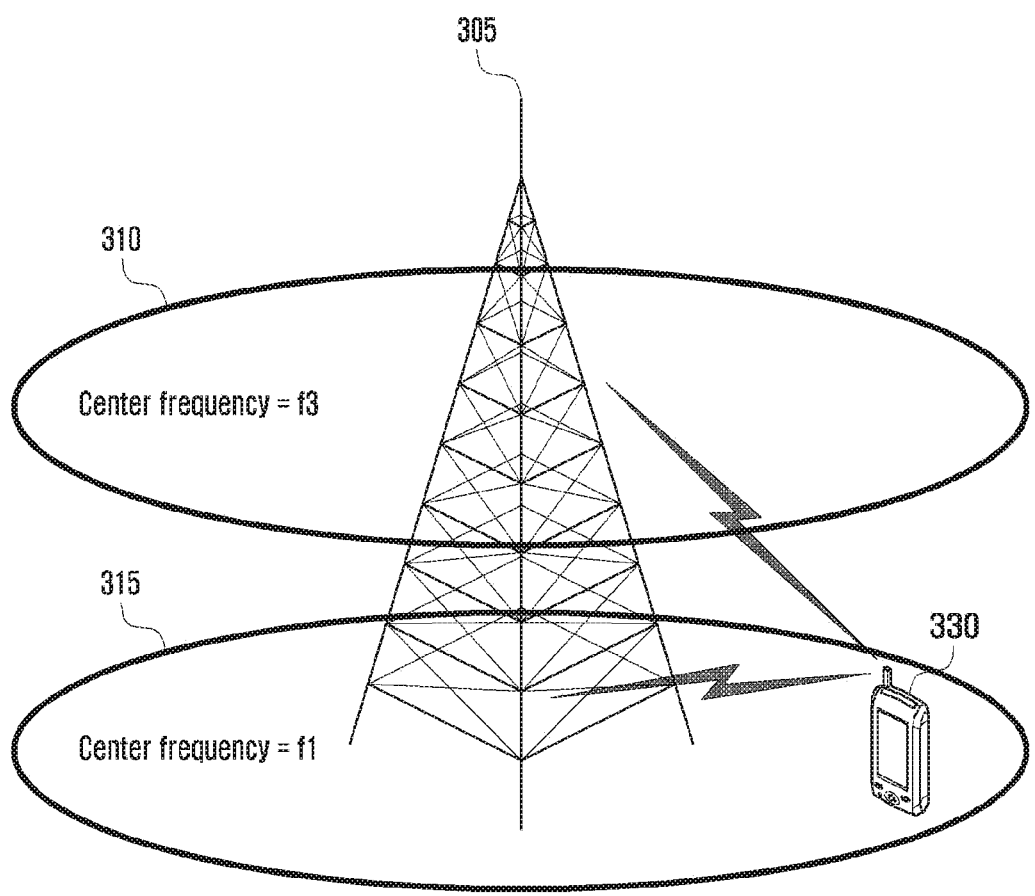
FIG. 3 is a diagram illustrating an exemplary situation of carrier aggregation in an LTE system according to an exemplary embodiment of the present invention.

FIG. 3 is a diagram illustrating an exemplary situation of carrier aggregation in an LTE system according to an exemplary embodiment of the present invention.

Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data using one of the carriers 310 and 315. However, if carrier aggregation is supported, then the UE 330 having the carrier aggregation capability can transmit/receive data using both the carriers 310 and 315. The eNB 305 can increase the amount of the resource to be allocated to the UE having the carrier aggregation capability in adaptation to the channel condition of the UE so as to improve the data rate of the UE.

By taking notice that a cell is configured with one downlink carrier and one uplink carrier in a conventional communication system, the carrier aggregation can be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" corresponds to transmission or reception data through control and data channels provided in a cell corresponding to center frequencies and frequency bands of the downlink and uplink carriers. Although the description is directed to an LTE mobile communication system for explanation convenience, exemplary embodiments of the present invention can be applied to other types of wireless communication systems supporting carrier aggregation.

Figure 4:
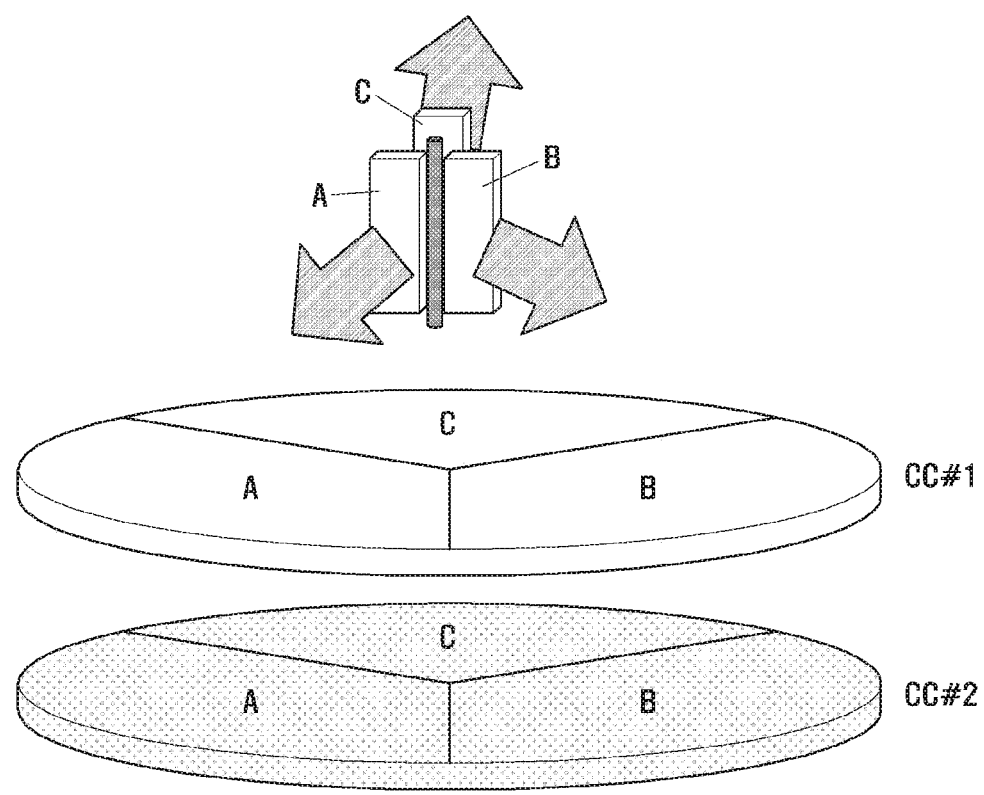
FIG. 4 is a diagram illustrating cells of 3 sector antenna-based site supporting carrier aggregation technology.
Figure 5:
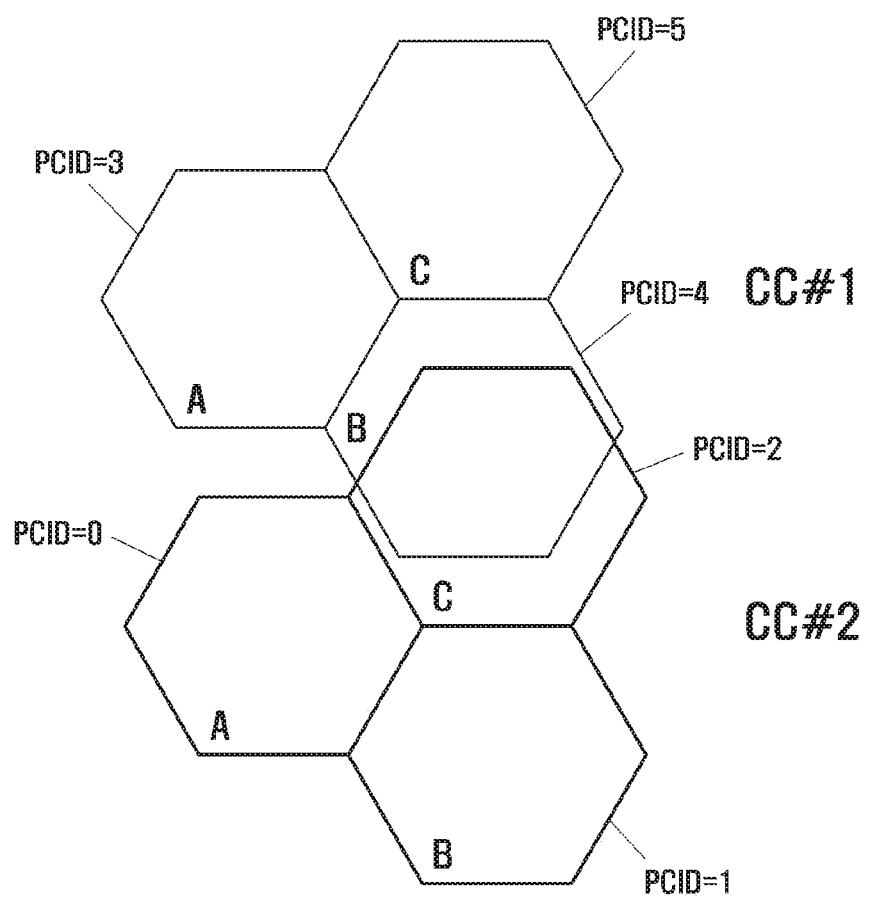
FIG. 5 is a diagram illustrating an exemplary network environment having network entities operating on primary and secondary carriers at different locations in a system according to an exemplary embodiment of the present invention.

FIG. 4 is a diagram illustrating cells of 3 sector antenna-based site supporting carrier aggregation technology. FIG. 5 is a diagram illustrating an exemplary network environment having network entities operating on primary and secondary carriers at different locations in a system according to an exemplary embodiment of the present invention supporting carrier aggregation.

Referring to FIG. 4 and FIG. 5, In order to receive a data service, a mobile communication system terminal, e.g. LTE UE, has association relationship with a base station providing the data service based on its transmission signal power and quality or the cell identified by PCID. The cell may determine the MIMO supportability of the UE based on the received channel condition and feedback information from the UE.

In the case of the UE supporting the carrier aggregation, it is possible to receive multiple data streams on different frequencies simultaneously. Logically, the carrier aggregation makes it possible to increase the peak data rate in proportion to the increase of the frequency BW (bandwidth).

Assuming that there are two cell sites supporting aggregation of at least two frequencies (e.g. CC #1 and CC #2) and each cell site is composed of 3 sector antennas (e.g. antennas A, B, and C), the best UE reception performance areas of each cell are formed by respective antenna boresight directions as indicated by the arrows as shown in FIG. 4.

In the system in which the adjacent cells reuse the same frequency for radio communication with the UEs such as LTE system, the cell-specific ID is used for decoding signals between the cell and the UE and thus the neighboring cells are allocated different IDs. In the case of LTE, such a cell-specific ID is referred to as Physical Cell ID (PCID) and, in FIG. 4, the sector antennas A, B, and C are identified by different PCIDs. In this case, the cells operating on the different frequencies CC #1 and CC #2 can be configured as shown in FIG. 5.

In the case of using the carrier aggregation technology, it is possible to configure the primary cell (PCell) and secondary cells (SCells) in various combinations with the exception of the cases restricted in the LTE standard. Because of the technical characteristics of transmission on multiple frequencies to a single UE, the data has to be transmitted through identical RLC entity (traffic buffer).

In Rel. 12, although it is possible to perform the carrier aggregation transmission using the Non-ideal Backhaul and separate RLC entities, this requires splitting RLC entities. The splitting of RLC entities requires designing separate operations on how to split the transmission traffics in association with the split multiple RLC entities and, furthermore, it is difficult to share information among the split multiple RLC entities, resulting in restriction in improving the real time transmission efficiency.

Although it is possible to increase the data amount transmitted at a time by widening the Tx BW with the carrier aggregation technique or increasing the number of streams for transmission to the UE through MIMO transmission. However the MIMO transmission may be restricted depending on the reception channel condition of the UE.

In the multi-cell environment, if the multiple cells transmit the data to the UE simultaneously, the signals transmitted by the respective cells interfere with each other and thus the UE. In particularly a UE located at the cell edge, receives signal at a low signal level, resulting in restriction of MIMO transmission.

In the case of using the carrier aggregation technology, if multiple frequencies form different cell coverage areas, it is possible to select the best frequency to transmit data; but if there is no large difference in size between the coverage areas as in the case of using the same antenna, their cell edge areas with low signal level are similar each other too.

In this case, inter-sector interference may occur on the same CC. Since the sectors belonging to the same CC use the same frequency band, the signals of the different sectors may interfere with one another. The interference is likely to be significant at the sector boundary. Since the sector-specific antennas transmit different signals, the signal transmitted by the antenna of a sector may become interference to certain UEs although it is a desired signal to the target UE. At the sector boundary, the UE is closest to another sector and thus likely to receive the signal transmitted by the antennas of the neighboring sector which acts as interference. The terms "sector boundary" and "cell boundary" are used in similar meanings.

In the case that the interference is significant, the MIMO transmission may be restricted. In the good channel condition (determined based on SNR or SINR), it is possible to increase the data rate through MIMO transmission with a plurality of data streams. In an interference vulnerable channel condition, however, the MIMO transmission is restricted. In this case, it is more efficient to use a strong single data stream and, if using MIMO transmission, MIMO multiplexing transmission other than MIMO diversity transmission. This means that the cell edge UE is limited in data rate. The present invention deals with a PCell and SCell configuration and signal transmission method that is capable of guaranteeing a predetermined data reception rate independently of the cell edge area which is implemented in such a way that multiple cells participated in MIMO transmission to a UE located at the cell edge in the carrier aggregation environment so as to achieve high reception data rate at the UE.

Figure 6:
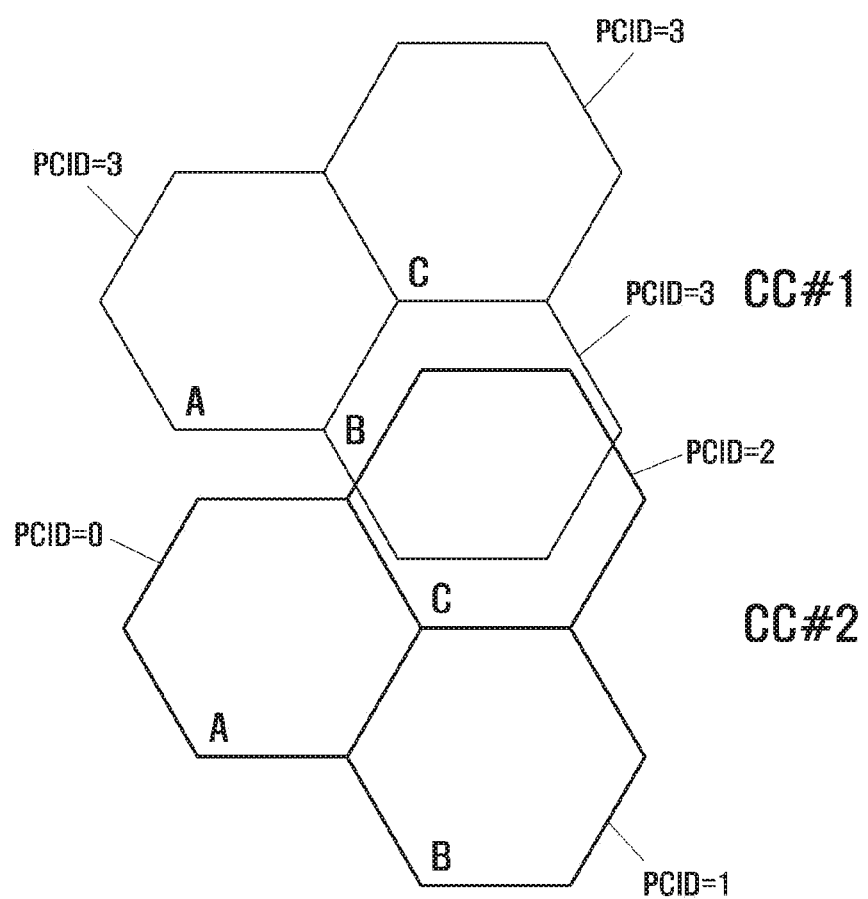
FIG. 6 is a diagram illustrating cellular a configuration with one CC made up of cells with same PCID and another CC made up of cells with different PCID.

FIG. 6 is a diagram illustrating cellular a configuration with one CC made up of cells with same PCID and another CC made up of cells with different PCID.

Referring to FIG. 6, embodiment of the present invention is directed to the system supporting carrier aggregation technology. In order to make it possible to perform MIMO transmission for a UE located at the cell edge, the system is configured as shown in FIG. 6. Unlike the system in FIG. 5, the cells operating on the same frequency are aggregated with the same PCID.

The present invention is characterized in that the PCID allocation is made differently per CC in the system supporting the carrier aggregation technology. That is, one CC is formed with the cells allocated the same PCID, while another CC is formed with the cells allocated different PCIDs in the system supporting the carrier aggregation technology. In the case that there are three or more carriers that can be aggregated, at least one CC formed with same PCID cells and at least one CC formed with different PCID cells have to be configured. That is, if there are three frequencies (i.e. CC#1, CC#2, and CC#3), {number of CCs formed with same PCID, number of CCs formed with different PCID} has to be {1,2} or {2,1}. In the following embodiment, CC#1 and CC#2 are carrier aggregated, CC#1 is formed with the same PCID cells, and CC#2 is formed with the different PCID cells. The method for use on the CC1# supporting downlink MIMO transmission to the UE through the antennas of multiple cells may be supported through the a CC formed with different PCID cells.

Through this configuration, it is possible to perform frequency-specific transmission with different signal qualities to the UE located at a location. In the case that the UE is located at the boundary between antennas A and B in FIG. 6, the number of signal streams receivable and modulation order at the UE is limited due to the interference in view of the CC#2. From the viewpoint of CC#1, however, it is possible to expect the effect in which the antennas A and B transmit the signal to the UE as if in the same cell, and thus high modulation order and multi-stream transmission. By aggregating the two frequencies in this way, the UE can receive the signal at a high data rate evenly anywhere within the entire coverage area.

Like CC#1 configured with a single PCID, it is possible to improve the data rate for a mobile or cell edge UE using the proposed MIMO transmission. In the conventional CC configuration with three sectors, it is possible to serve three UEs simultaneously but, if the same PCID is allocated to the sectors like CC#1, it is impossible to serve multiple UEs simultaneously. If the CA technique is applied as proposed in an embodiment of the present invention, it is possible to increase the data rate for the mobile or cell edge UE through the cells allocated the same PCID like CC#1 while compensating for the shortcoming caused by PCID fixation using the cells allocated different PCIDs like CC#2. The CA-enabled UE has to configure PCell and SCell. Descriptions are made of the method of configuring PCell and/or SCell per CC and changing CC and configuration timing in detail hereinafter.

Embodiment of the present invention, in order to determine whether to receive the signal through at least two cells of CCs and to select the primary cell (PCell) for the carrier aggregation, the base station may use the position information and mobility information of the UE. The location of the UE is determined based on the qualities of the signals received from the respective cells other than using its geographical location. The received signal strength at the UE is determined based on the signal strength informing of relative distances from the cells as well as the channel quality information (Channel Status Information) feedback including the neighbor cell interference information). It may be the RSRPs from the respective cells which the UE measures as defined in LTE. In the case of CC#1, since the multiple cells use the same PCID, the UE may not measure the RSRP in the legacy Rel. 11 standard. In this case, the SRS transmitted by the UE in uplink may be used.

According to present invention, it is possible to accomplish the MIMO transmission to the UE located at a cell edge in such a way of transmitting different data through multiple cells. In this case, it is possible to perform the MIMO transmission using the number of antennas of each cell or the sum of antennas of the multiple cells. It is also possible to increase the reception performance in such a way of transmitting the same signal through two cells which operate in MIMO transmission mode independently.

PCell or SCell of UE is determined based on at least one of mobility, control channel usage amount, uplink resource usage amount, handover command, and load.

A mobility of the UE may be determined based on the change in feedback or location information of the UE. The information for use in determining mobility may include Reference Signal Received Power (RSRP), Channel Quality Information (CQI), and mobility status information. The eNB may predict the UE mobility based on the RSRP or CQI transmitted by the UE. The RSRP can be used to estimate the distance from a neighbor cell or sector and movement in the serving cell. It is advantageous to configure the PCell of the mobile or cell/sector edge UE in the CC consisting of cells allocated the same PCID. In order to determine mobility state, the eNB may use a predetermined criterion. For example, a threshold value may be used. If the UE mobility is equal to or greater than a predetermined threshold, the eNB may designate a sector of the CC consisting of the sectors using the same PCID.

In the case of moving to a cell/sector of the CC consisting of the cell/sectors using the different PCIDs, handover may occur. If a handover to the PCell is triggered, this entails a handover to SCell(s). Accordingly, when the UE is roaming, it is preferred to designate a cell of the CC consisting of the cell using the same PCID as the PCell to reduce the number of handovers to PCell and number of cell edges without compromising communication efficiency. In the case that the UE moves little around the center of the cell/sector or the UE mobility is less than the threshold, it may be preferred to designate a sector of the CC consisting of the sectors using different PCIDs as the PCell. In this way, it is possible to protect against the resource problem caused by configuring the sectors of a CC with the same PCID because the throughput problem occurring at the cell edge does not exist at the cell center. Instead of the mobility, another criterion can be used for designating the PCell.

In the case of determining the PCell and SCells of the UE using the location and mobility information of the UE, the PCell and SCell determination criteria are selected according to control channel usage amount($\Gamma_{c,i}$) per cell (i) of each CC(c), per-cell UL resource usage ($H_{c,i}$), inter-cell Handover amount ($\theta_c$), and per-cell data load ($L_{c,i}$)

In the case of CC#1, the three cells have to use the same control channel. Although it is possible to use the control channel which is independent of PCID such as EPDCCH defined in Rel. 11, this approach requires extra control channel, resulting in increase of overhead.

In the case of using the UL resource, the UL transmission may be restricted to the PCell in the carrier aggregation mode depending on the UE capability and thus, if the PCells are concentrated on a specific CC, UL resource restriction may occur. Therefore control channel usage amount or/and uplink resource usage amount is/are considered when a base station or a network entity determines PCell of the UE.

Although handover (HO) can be perform through a simple signaling procedure with the exception among the three cells of CC#1, there has to be a HO operation between the cells of the CC#2, the HO operation affecting the reception performance of the UE. Therefore handover or/and load is/are considered when a base station or a network entity determines PCell of the UE.

The PCell (p) and SCell (s) of the UE x are selected based on the criteria as follows. For example, PCell (p) and SCell (s) of the UE x are selected in an ascending order of priority of the criteria as follows.

Criteria 1. Mobility $$\{p,s\}_x = f_m(x)$$

$f_m$ is a function of determining whether to configure the PCell of the UEx as the CC using the same PCID according to the user mobility, cell configuration scheme of CC#1, and UE location. The output may be a combination of {p, s} required to be configured by UEx or Null which is not necessary to be determined by criteria 1. If it is not necessary to perform the determination based on criteria 1, check criteria 2.

Criteria 2. Control channel usage amount & uplink resource usage amount $$\{p, s\}_x = \arg\max_{(p,s)} w(\Gamma_{c,i}, H_{c,i}, x)$$

W is a function of determining whether to configure the PCell of the UEx as the CC using the same PCID according to the control channel usage amount and UL resource usage amount of the cells of the serving cell site of the UEx. The output may be a combination of {p, s} required to be configured by UEx or Null which is not necessary to be determined by criteria 2. If it is not necessary to perform the determination based on criteria 2, check criteria 3.

Criteria 3. HO & Load $$\{p, s\}_x = \arg\max_{(p,s)} U(\Theta_c, L_{c,i}, x)$$

U is function of determining a cell to be configured as the PCell of the UEx according to the current HO amount and target HO amount of the cells of the serving cell site of the UEx and the load of each cell. The output may be a combination of {p, s} required to be configured by UEx or Null which is not necessary to be determined by criteria 3. If it is not necessary to perform the determination based on criteria 3, check other criteria.

*84In the system configured with a plurality CCs of which at least one consists of the cells using the same PCIDs, the PCell of a UE may be determined based on criteria 1-3. Although the above description has been directed to the case where the criteria 1-3 are applied in order, the criteria may be applied in a different order or at least one criterion may be omitted. It is also possible to designate a sector of the CC consisting of the sectors using the same PCID as the PCell or not without using the criteria as default setting of the eNB.

Figure 7:
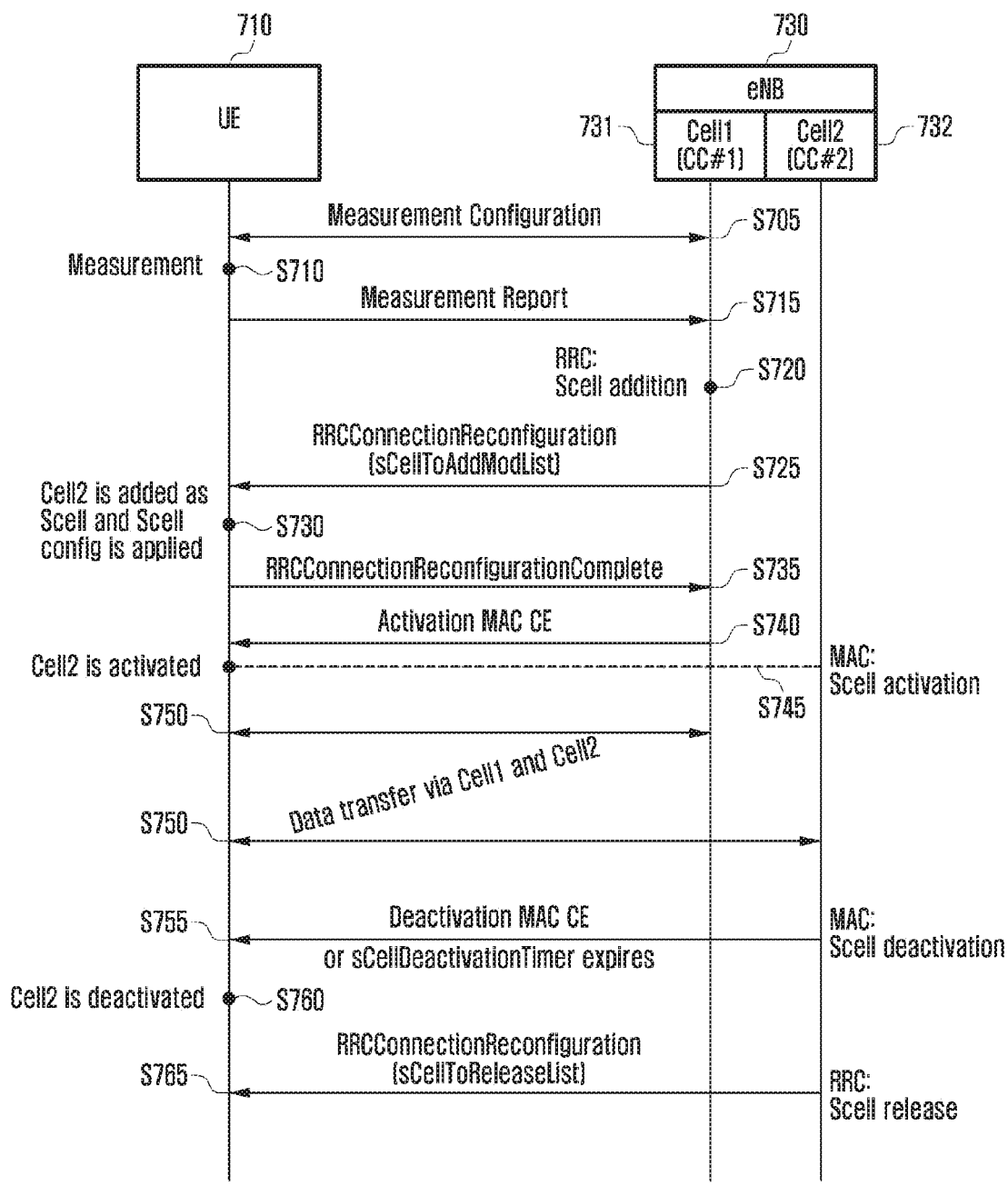
FIG. 7 is a signaling diagram CA technology proposed for use in normal LTE mobile communication system.

FIG. 7 is a signal flow diagram illustrating signal flows of CA technique in a mobile communication system according to an embodiment of the present invention.

Referring to FIG. 7, the mobile communication system includes a UE 710 and an eNB 730. The eNB may have a plurality of Component Carriers (CCs). For example, the eNB may manage CC#1 731 and CC#2 732. The measurement configuration is made between the UE 710 and the eNB 730 at step S705. The UE 710 measures radio channel condition according to the measurement configuration. The measurement result can be used in various operations of the UE 710 and the eNB 730. For example, the measurement result can be used in scheduling, handover, PCell change, and SCell add operations. If a measurement report event occurs, the UE 710 reports the measurement result at step S715. The measurement report may be delivered periodically or non-periodically.

The eNB 730 determines whether to add an SCell based on the measurement result at step S720. The eNB 730 sends the UE 710 an SCell Add request message at step S725. The SCell Add request message may be the RRCConnectionReconfiguration message. The RRCConnectionReconfiguration message may include the identity information (sCellToAddModList) of the SCell to be added. In FIG. 7, it is assumed that CC#2 732 is added. The UE 710 adds the CC#2 based on the SCell Add request message and performs configuration for adding the SCell at step S730. The UE 710 sends the eNB 730 an SCell Add Complete message at step S735. The SCell Add Complete message may be the RRCConnectionReconfigurationComplete message.

The eNB 730 notifies the UE 710 of the SCell to be activated/deactivated among the configured SCells at step S740. At this time, the Activation/Deactivation MAC Control Element (CE) may be used. In FIG. 7, it is assumed that CC#2 732 is activated. Upon receipt of this message, the UE 710 checks the SCell to be activated/deactivated and activates the checked SCell at step S745. In FIG. 7, CC#2 is checked. Afterward, the UE 710 and the eNB 730 perform data communication through CC#1 731 and CC#2 732.

The activated CC#2 of UE 710 is deactivated at step S755. For example, when the deactivation MAC CE is received or when a timer (SCellDeactivationTimer) expires, the UE 710 deactivates CC#2 732. The UE 710 deactivates the corresponding cell (CC#2) at step S760. The eNB 730 sends the UE 710 a message for releasing the CC#2 732. This message may be the RRCConnectionReconfiguration message. This message may include a list of the SCells to be released (sCellToReleaseList).

The CC add and activation operations and deactivation and release operations are performed as described above. The CC consisting of the cells using the same PCID also may be added, released, activated, and deactivated in the same manner. One of the CC#1 731 and CC#2 732 is the CC consisting of the sectors identified by the same PCID, and the other is the CC consisting of the sectors identified by different PCIDs.

Figure 8:
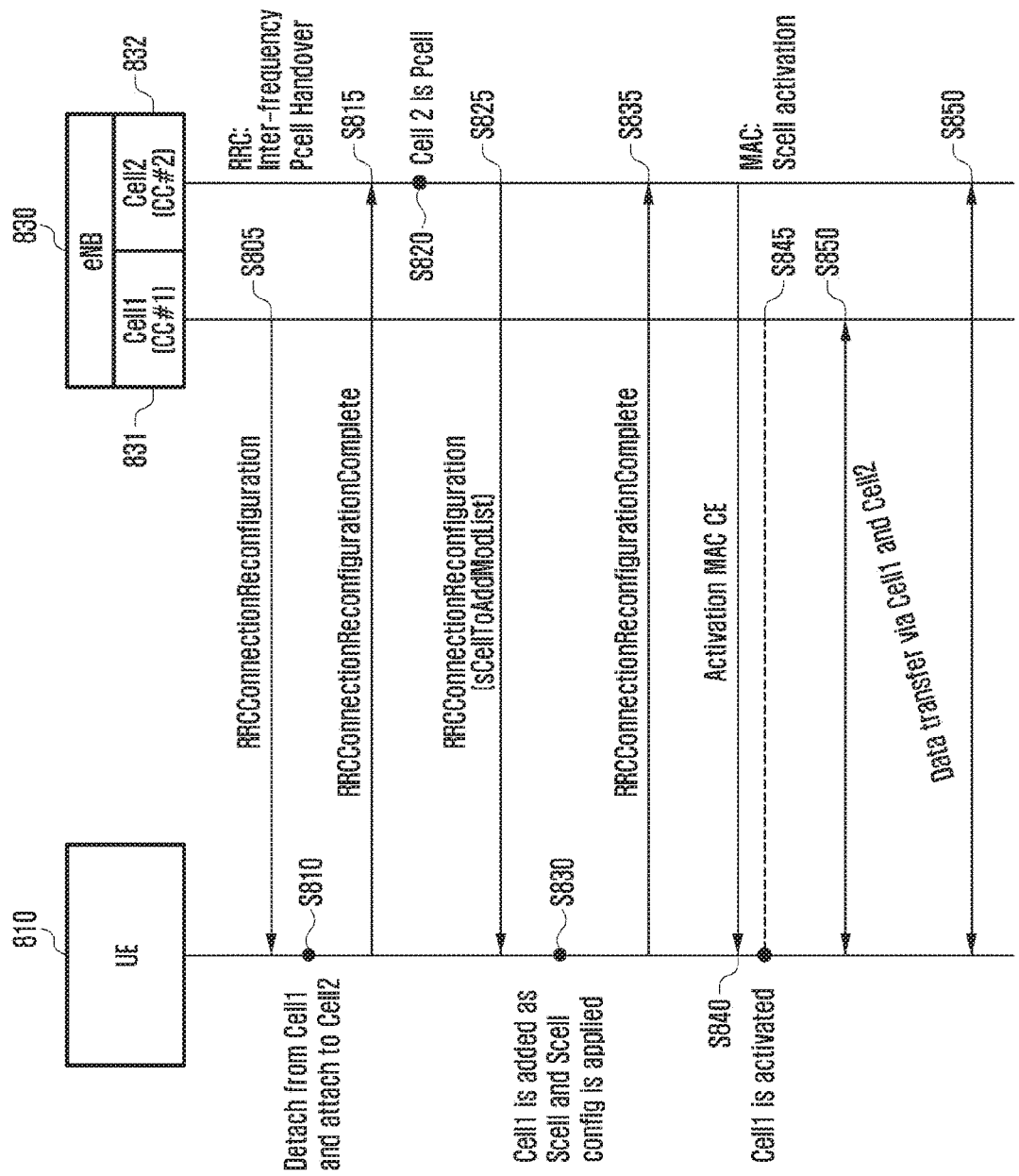
FIG. 8 is a signaling diagram signaling for PCell change according to the present invention.

FIG. 8 is a signal flow diagram illustrating a PCell change procedure in a mobile communication system according to an embodiment of the present invention.

Referring to FIG. 8, the mobile communication system includes a UE 810 and an eNB 9=830. The eNB 830 may have a plurality of CCs. For example, the eNB 830 may manage CC#1 831 and CC#2 832. The measurement configuration may be made between the UE 810 and the eNB 830. The UE 810 measure radio channel condition according to the measurement configuration. The measurement result can be used in various operations of the UE 810 and the eNB 830. For example, the measurement result can be used in scheduling, handover, PCell change, and SCell add operations. If a measurement report event occurs, the UE 810 reports the measurement result at step 5815. The measurement report may be delivered periodically or non-periodically. FIG. 8 is directed to the case where the measurement report is used for changing PCell. The parameter for use in PCell change of the eNB 830 is not limited to the measurement report. In FIG. 8, it is assumed that the current PCell is CC#1 831. The eNB 830 determines to change the PCell. The PCell change may be triggered for various reasons and determined in consideration of various criteria as described with reference to FIG. 6. One of the CC#1 831 and CC#2 832 is the CC consisting of the sectors identified by the same PCID, and the other is the CC consisting of the sectors identified by different PCIDs.

The eNB 830 may decide to move the PCell from CC#1 831 to CC#2 832. The eNB 830 sends the UE 810 a PCell Change message at step 5805. The PCell Change message may be the RRCConnectionReconfiguration message. Upon receipt of the PCell Change message, the UE 810 performs the PCell change procedure at step S810. For example, the UE 810 may perform the detach operation to the CC#1 and then the attach operation to the CC#2 832. The UE 810 sends the eNB 830 a PCell Change Response message at step S815. The PCell Change Response message may be the RRCConnectionReconfigurationComplete message. Through this process, the PCell of the UE 810 is moved from the CC#1 831 to the CC#2 832. Then the eNB 830 communicates with the UE 810 through the PCell in CC#2 832.

The eNB 830 adds the CC#1 831 as an SCell to the UE 810 at step S820.

The eNB 830 sends the UE 810 a message requesting for adding the CC#1 as an SCell at step S825. The request message may be the RRCConnectionReconfiguration message. The RRCConnectionReconfiguration message may include an identity information (sCellToAddModList) of CC#1 831. The UE 810 adds the CC#1 831 as an SCell based on the SCell Add Request message and performs SCell configuration at step S830. The UE 810 sends the eNB 830 a SCell Add Response message at step 835. The SCell Add Response message may be the RRCConnectionReconfigurationComplete message.

The eNB 830 notifies the UE 810 of the SCell to be activated/deactivated among the configured SCells at step S840. For this purpose, the Activation/Deactivation MAC Control Element (CE) may be used. In FIG. 8, it is assumed that the CC#1 831 is activated. Upon receipt of the notification, the UE 810 checks the SCell to be activated/deactivated and activates the checked SCell at step S845. FIG. 8 is directed to the case where the CC#1 831 as a SCell is activated. Afterward, the UE 810 and the eNB 830 perform data communication through CC#1 831 and CC#2 832. The procedure of moving the PCell from CC#1 831 to CC#2 832 and adding a new cell has been described hereinabove. As described above, it is possible to configure the PCell in the CC consisting of the sectors using the same PCID or the CC consisting of the sectors using different PCIDs depending on the UE state, move the PCell from one CC to another, and add the CC having no PCell as a new SCell. The PCell change procedure is similar to the inter-frequency handover. Meanwhile, if the PCell and SCell are determined simultaneously, the SCell activation can be performed by configuring the sCellToAddModList in the RRCConnectionReconfiguration message in changing the PCell other than using an extra RRC message for adding the SCell.

Figure 9:
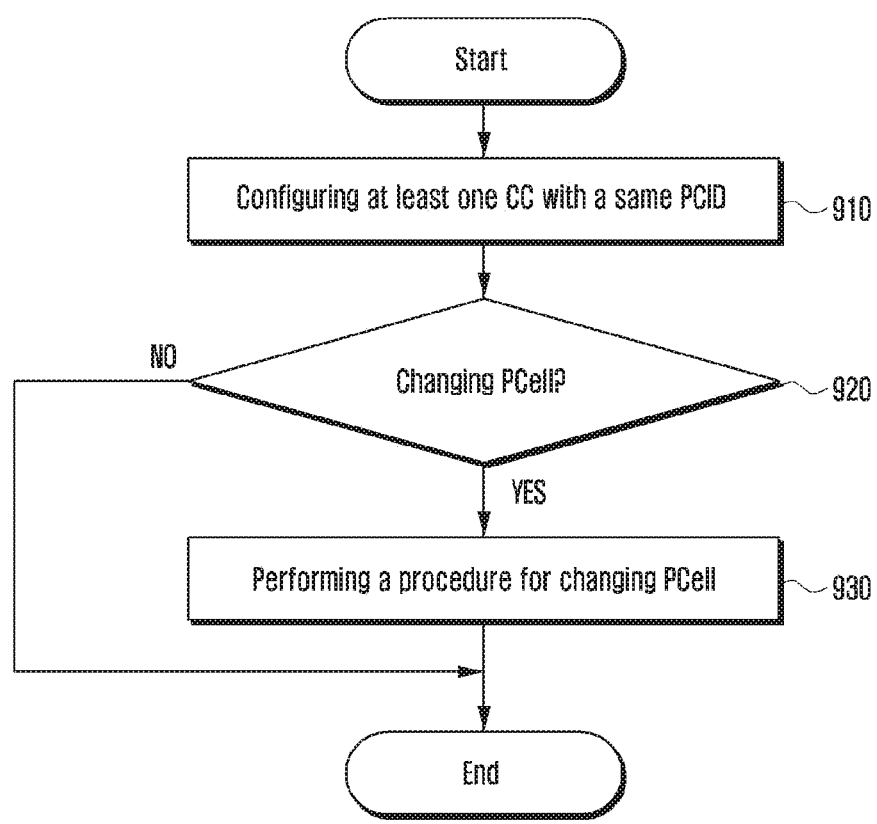
FIG. 9 is a flowchart illustrating a procedure for configuring PCell/SCell according to the present invention.

FIG. 9 is a flowchart illustrating a PCell/SCell configuration procedure according to an embodiment of the present invention. Although FIG. 9 is directed to the eNB-initiated PCell change procedure, the PCell change may be initiated by any other network entity.

Referring to FIG. 9, the eNB configures at least one CC consisting of the sectors using the same PCID at step 910. That is, a CA-enabled may be configured with one at least one CC consisting of the sectors using the same PCID and at least one CC consisting of sectors using different PCIDs. In the case that the eNB has at least three CA-capable frequencies, there may be a few combinations of at least one CC consisting of the sectors using the same PCID and at least one CC consisting of the sectors using different PCIDs. Assuming three frequencies CC#1, CC#2, and CC#3, {number of same PCID sectors CCs, number of different PCID sectors CCs} is {1,2} or {2,1}.

The eNB determines whether PCell/SCell change is required at step 920. If no PCell change is required, the procedure ends. Otherwise if the PCell change is required, the procedure goes to step 930. The PCell change may be determined depending on whether the UE channel state requires the PCell belonging to the CC consisting of the same PCID sectors or the CC consisting of the different PCID sectors. In the state that the PCell of a certain UE is configured in the CC consisting of the sectors using different PCIDs, if it becomes necessary to configure the PCell in the CC consisting of the sectors using the same PCID, this is determined that the PCell change is required.

The eNB initiates the PCell/SCell change procedure at step 930. The PCell change may entail SCell change. The SCell change is performed through the SCell Add and SCell activation operation after the PCell change is completed.

In order to perform the PCell change procedure, the eNB may select the CC in which the PCell is configured. Various criteria may be used for selecting the CC. For example, the CC may be selected based on at least one of UE mobility, control channel use amount, uplink resource use amount, handover, and load. The CC selection method is described in detail with reference to FIG. 10.

The process of making PCell/SCell change decision may be the process of configuring CCs along with PCell/SCell. For example, the operation of step 920 may be performed in the case of configuring or selecting a CC as well as moving the PCell to another CC. For example, the operation of step 920 may be performed in selecting a component carrier for the PCell in the course of initial attach or idle mode.

Figure 10:
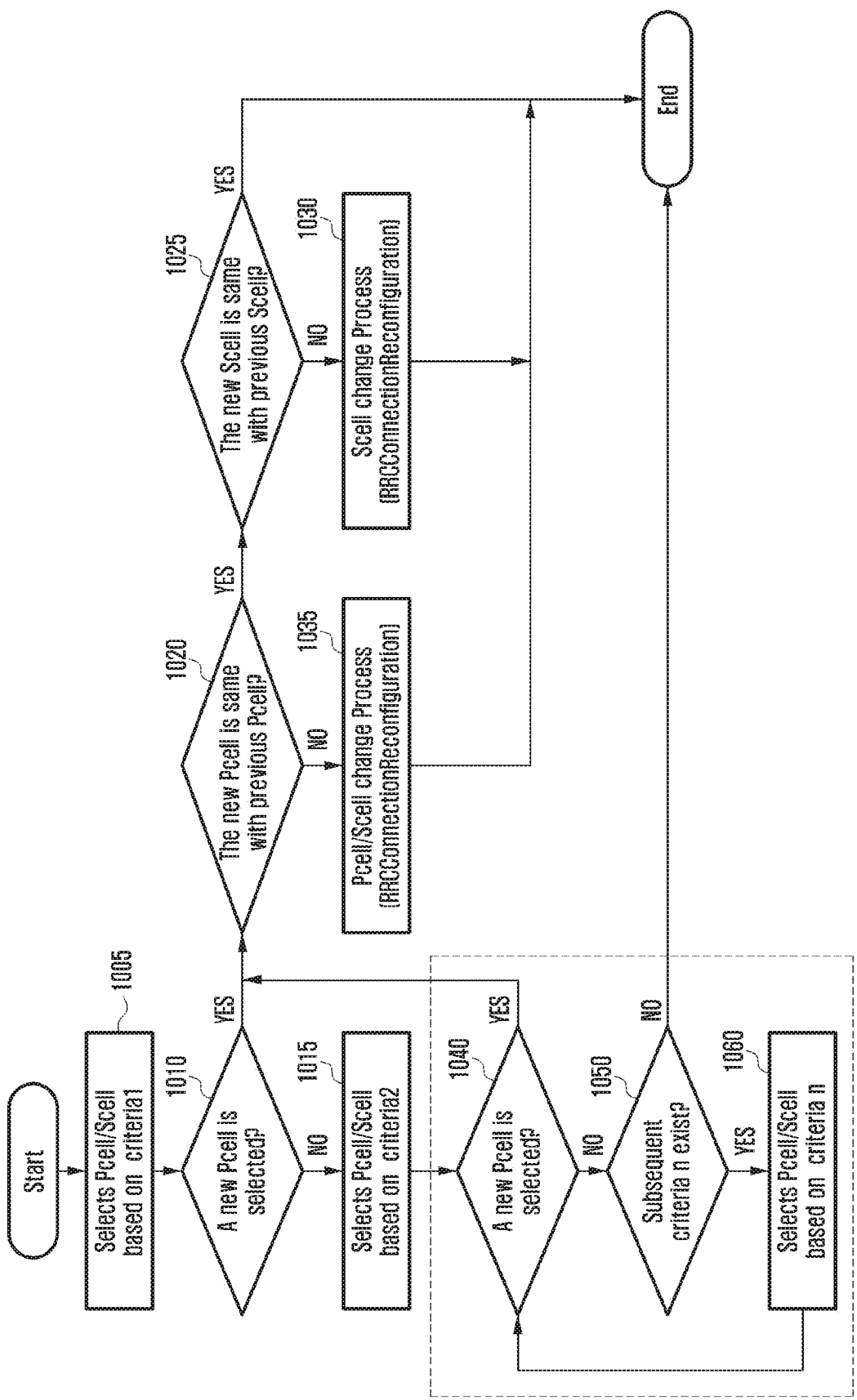
FIG. 10 is a flowchart illustrating a procedure for changing PCell/SCell according to the present invention.

FIG. 10 is a flowchart illustrating a PCell/SCell selection procedure according to an embodiment of the present invention.

A description is made of the procedure of determining the PCell and SCell based on the criteria proposed in an embodiment of the present invention with reference to FIG. 10. The PCell/SCell reselection is performed periodically or non-periodically, i.e. when a predetermined event occurs. If a combination of PCell and SCell is made based on high selection criteria and if the PCell differs from the previous PCell, a PCell-SCell combination change procedure is performed. In the case of changing only SCell, a SCell change procedure is performed. The procedure of changing the PCell or SCell may be performed as described with reference to FIG. 7 or 8. In neither PCell nor SCell is selected based on a selection criterion, the PCell/SCell selection procedure is repeated with a next order selection criterion.

Although this embodiment of the present invention is directed to the case where the selection criteria is applied in order, it is also possible to select the best suited PCell or SCell in consideration of the result obtained by applying multiple selection criteria simultaneously. The priorities of the selection criteria may change. For example, FIG. 6 is directed to the case where the mobility is applied with priority and then other criteria in the order of resource use amount, uplink resource use amount, handover, and load. However, the order is not limited thereto but the resource user amount or load may be considered with priority. If the UE mobility is equal to or greater than a predetermined threshold, it is prefer to apply the mobility with priority.

The eNB selects one of the PCell and SCells based on the selection criteria at step 1005. The PCell/SCell selection is performed periodically or non-periodically. When configuring initial cell to the UE, changing, modifying, or adding a cell, at least one of the PCell and SCells is selected. For example, when a periodic or non-periodic event occurs, the eNB may skip selecting a new PCell or SCell. The criteria-based PCell/SCell selection procedure is performed with the selection criteria proposed in the embodiment of FIG. 6.

The eNB determines whether a new PCell/SCell is selected at step 1010. If a new PCell is selected, the procedure goes to step 1020 and, otherwise, step 1015.

At step 1020, the eNB determines whether the newly selected PCell is identical with the old PCell. If the new PCell is different from the old PCell, the eNB changes the old PCell for the new PCell. The eNB performs the PCell/SCell change procedure. The PCell/SCell change procedure may be performed as described with reference to FIG. 8. If the PCell/SCell change procedure is completed, the eNB and the UE communicate through the newly selected PCell/SCell.

If the new PCell is different from the old PCell at step 1020, the procedure goes to step 1025. If the new PCell is identical with the old PCell, this is the case where the old PCell is reselected and thus there is no change of PCell. The eNB determines whether the newly selected SCell is identical with the old SCell at step 1025. If the new SCell is identical with the old SCell, the procedure ends. If the new SCell is different from the old SCell, this means the SCell change occurs and thus the procedure goes to step 1030. The eNB performs the SCell change procedure. The SCell change procedure may be performed as described with reference to FIG. 8. If the SCell change procedure is completed, the eNB communicates with the UE through the PCell and the new SCell.

As described above, the PCell and/or SCell change procedure is performed by selecting PCell/SCell newly and comparing the newly selected cell with the old cell.

At this time, the selection criterion may be the mobility or location. The eNB may select a PCell/SCell based on the UE mobility or location at step 1005. At this time, the PCell/SCell selection is to select a sector of a CC consisting of the sectors using the same PCID or different PCIDs as the PCell or SCell. For the mobile UE or a sector/cell edge UE, the eNB selects the PCell in the CC consisting of the sectors using the same PCID. At this time, at least one SCell may be selected from the CC consisting of the sectors using different PCIDs.

The eNB may consider other selection criteria as well as the mobility. For example, if no new PCell is selected at step 1010, the eNB may use another selection criterion to select a new cell. If no new PCell is selected, the procedure goes to step 1015. At step 1015, the eNB selects a PCell/SCell using another selection criterion. If criterion 1 is used at step 1005, the new selection criterion used at step 1015 may be criterion 2 or criterion 3. If no new PCell is selected with criterion 1, the PCell/SCell selection may be retried with the criterion 1.

If the PCell is selected at step 1040, the eNB returns the procedure to step 1020. The steps following step 1020 are performed as described above.

If no PCell is selected at step 1040, the eNB checks the next order criterion at step 1050. If there is no next criterion, the procedure ends. If there is the next criterion, the eNB selects the PCell/SCell at step 1060. Afterward, the procedure goes to step 1040. The steps following step 1040 are performed as described above. In the same way, the PCell/SCell may be selected in consideration of multiple criteria.

Figure 11:
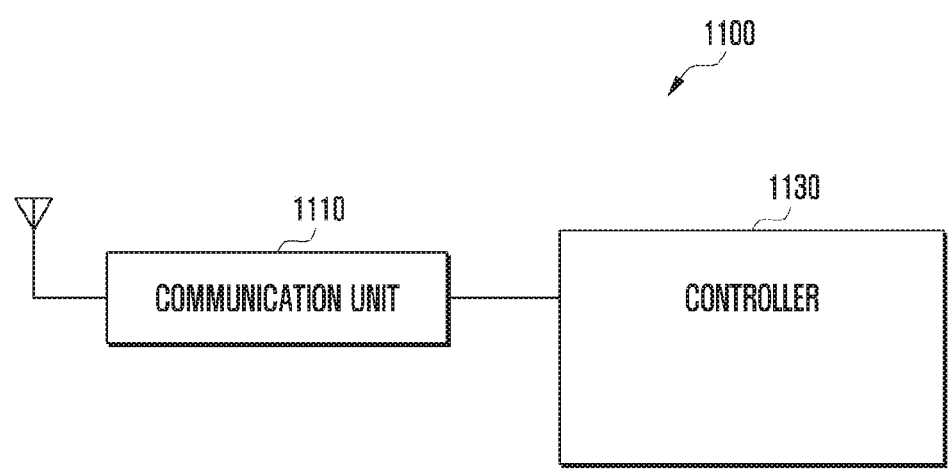
FIG. 11 is a block diagram illustrating a configuration of an eNB according to an exemplary embodiment of the present invention.

FIG. 11 is a block diagram illustrating a configuration of the eNB according to an embodiment of the present invention.

As shown in FIG. 11, the eNB 1100 includes a communication unit 1110 and a control unit 1130. The communication unit 110 may transmit and/or receive signals. The control unit 1130 controls overall operations of the eNB 1100. The control unit 1130 also controls the operation of configuring to a cell to a UE and changing the cell.

According to an embodiment of the present invention, the control unit 1130 may control transmitting configuration information for a first cell to a terminal, transmitting configuration information for a second cell to the terminal and communicating with the terminal via the first cell and the second cell. One of the first and second cells is set same Physical Cell Identifier "PCID" and the other is set different PCIDs.

The control unit 1130 may control to control transmitting configuration information for a first cell to a terminal, transmitting configuration information for a second cell to the terminal and communicating with the terminal via the first cell and the second cell. At least one of the first and second cells is set same Physical Cell Identifier "PCID".

The control unit 1130 may control to configure a first cell having at least two sectors formed with different antennas to the UE and a second cell having at least two sectors formed with different antennas to the UE for communication with the UE through the first and second cells. At this time, the sectors of one of the first and second cells are allocated the same PCID and the sectors of the other cell are allocated different PCIDs. One of the first and second cells a Primary cell (PCell) and the other is a Secondary cell (SCell).

The control unit 1130 may control to select the PCell of the UE based on predetermined selection criteria. The control unit 1130 checks the UE mobility and, it is determined that the UE is mobile, controls to configure a cell of which sectors use the same PCID as the PCell among the first and second cells. The UE mobility may be determined based on at least one of the channel state information (CSI) and reference signal received power (RSRP) received from the UE.

The control unit 1130 checks the location of the UE and, if the UE is located at a cell/sector edge, controls the cell consisting of the sectors using the same PCID as the PCell among the first and second cells.

The control unit 1130 also may control to select the PCell of the UE based on at least one of per-cell control channel use amount information, uplink resource use amount information, handover information, and load information.

Although the description is made of the individual blocks constituting the eNB 1100 for explanation convenience, the configuration of the eNB is not limited thereto. The control unit 1130 may perform the operations described in the embodiments of FIGS. 1 to 10 as well as the operations described with reference to FIG. 11.

Figure 12:
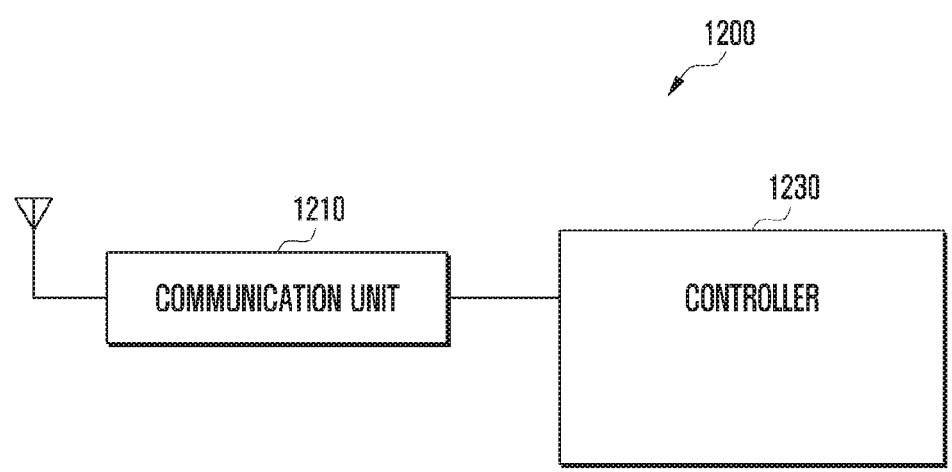
FIG. 12 is a block diagram illustrating a configuration of a UE according to an exemplary embodiment of the present invention; and Throughout the drawings, it should be noted that like reference numbers are used to depict the same or similar elements, features, and structures.

FIG. 12 is a block diagram illustrating a configuration of the UE according to an embodiment of the present invention.

As shown in FIG. 12, the UE 1200 includes a communication unit 1210 and a control unit 1230. The communication unit 1210 is responsible for transmitting and/or receiving signals. The control unit 1230 controls overall operations of the UE 1200. The control unit 1230 also controls the operations of measuring and reporting channel state, configuring the PCell and SCell based on the cell configuration information transmitted by the eNB, and communicating with the eNB through the configured cells.

According to an embodiment, the control unit 1230 control receiving configuration information for a first cell, receiving configuration information for a second cell and communicating via the first and second cells. One of the first and second cells is set same Physical Cell Identifier "PCID" and the other is set different PCIDs.

The control unit 1230 may control receiving configuration information for a first cell, receiving configuration information for a second cell and communicating via the first and second cells. wherein at least one of the first and second cells is set same Physical Cell Identifier "PCID".

The control unit 1230 may control to receive the configuration information about the first cell including at least two sectors formed with different antennas and the configuration information about the second cell including at least two sectors formed with different antennas, and to perform communication through the first and second cells based on the configuration information about the first and second cells. At this time, the sectors constituting one of the first and second cells are allocated the same PCID, and the sectors constituting the other cell are allocated different PCIDs. One of the first and second cells is the primary cell (PCell), and the other is a secondary cell (SCell).

The control unit 1230 also may control to send the eNB the mobility information and receive the PCell configuration information in correspondence to the mobility information. If it is determined that the UE is mobile based on the mobility information, the PCell configuration information may be the information instructing to configure the cell consisting of the sectors using the same PCID as the PCell among the first and second cells.

The UE mobility information may include at least one of the channel state information (CSI) and reference signal received power (RSRP).

If the UE is located at the cell/sector edge, the PCell configuration information may be the information instructing to configure the cell consisting of the sectors using the same PCID as the PCell among the first and second cells.

The PCell may be determined based on at least one of per-cell control channel use amount information, uplink resource use amount information, handover information, and load information.

Although the description is made of the individual blocks constituting the UE 1200 for explanation convenience, the configuration of the UE is not limited thereto. The control unit 1230 may perform the operations described in the embodiments of FIGS. 1 to 10 as well as the operations described with reference to FIG. 11.

As described above, the timing advance group management method and apparatus according to exemplary embodiments of the present invention is capable of informing of the timing advance group to which each carrier belongs and managing multiple timing advance groups efficiently without signaling overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A terminal in a mobile communication system supporting carrier aggregation (CA), the terminal comprising:
    a transceiver configured to transmit and receive signals; and
    a controller coupled with the transceiver and configured to:
        receive, from a base station, configuration information for configuring a first cell allocated with a first component carrier (CC),
        receive, from the base station, configuration information for adding a second cell allocated with a second CC, and
        communicate with the base station, based on the CA of the first CC of the first cell and the second CC of the second cell,
    wherein sectors of the first cell are allocated with a same physical cell identifier (PCID),
    wherein sectors of the second cell are allocated with PCIDs that are different from the same PCID allocated to the sectors of the first cell, and
    wherein the PCIDs allocated to the sectors of the second cell are different from each other.

2. The terminal of claim 1,
    wherein each of the first and second cells includes at least two sectors, and
    wherein PCID is allocated to each sector.

3. The terminal of claim 1,
    wherein the controller is configured to receive, from the base station, primary cell (PCell) configuration information corresponding to mobility information of the terminal, and wherein the PCell configuration information indicates the terminal to configure the first cell as the PCell, in case that the terminal is identified to be mobile based on the mobility information.

4. The terminal of claim 3, wherein the mobility information comprises at least one of channel state information or reference signal received power.

5. The terminal of claim 1,
wherein the controller is configured to receive, from the base station, primary cell (PCell) configuration information, and
wherein the PCell configuration information indicates the terminal to configure the first cell as the PCell, in case that the terminal is located at a cell edge or a sector edge.

6. The terminal of claim 1, wherein a primary cell (PCell) of the terminal is selected based on at least one of per-cell control channel amount information, uplink resource use amount information, handover information, or load information.

7. A method performed by a terminal in a mobile communication system supporting carrier aggregation (CA), the method comprising:
receiving, from a base station, configuration information for configuring a first cell allocated with a first component carrier (CC);
receiving, from the base station, configuration information for adding a second cell allocated with a second CC; and
communicating with the base station, based on the CA of the first CC of the first cell and the second CC of the second cell,
wherein sectors of the first cell are allocated with a same physical cell identifier (PCID),
wherein sectors of the second cell are allocated with PCIDs that are different from the same PCID allocated to the sectors of the first cell, and
wherein the PCIDs allocated to the sectors of the second cell are different from each other.

8. The method of claim 7,
wherein each of the first and second cells includes at least two sectors, and
wherein PCID is allocated to each sector.

9. The method of claim 7, further comprising:
receiving, from the base station, primary cell (PCell) configuration information corresponding to mobility information of the terminal,
wherein the PCell configuration information indicates the terminal to configure the first cell as the PCell, in case that the terminal is identified to be mobile based on the mobility information.

10. The method of claim 9, wherein the mobility information comprises at least one of channel state information or reference signal received power.

11. The method of claim 7, further comprising:
receiving, from the base station, primary cell (PCell) configuration information,
wherein the PCell configuration information indicates the terminal to configure the first cell as the PCell, in case that the terminal is located at a cell edge or a sector edge.

12. The method of claim 7, wherein a primary cell (PCell) of the terminal is selected based on at least one of per-cell control channel amount information, uplink resource use amount information, handover information, or load information.

* * * * *